(12) United States Patent
Michl et al.

(10) Patent No.: US 7,297,205 B2
(45) Date of Patent: Nov. 20, 2007

(54) USE OF POLYACRYLIC ACIDS AS GRINDING AIDS FOR CALCIUM CARBONATE

(75) Inventors: Kathrin Michl, Ludwigshafen (DE); Michael Gotsche, Mannheim (DE); Jens Rieger, Ludwigshafen (DE); Kati Schmidt, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 46 days.

(21) Appl. No.: 10/548,582

(22) PCT Filed: Mar. 5, 2004

(86) PCT No.: PCT/EP2004/002242

§ 371 (c)(1), (2), (4) Date: Sep. 12, 2005

(87) PCT Pub. No.: WO2004/080899

PCT Pub. Date: Sep. 23, 2004

(65) Prior Publication Data

US 2006/0287423 A1    Dec. 21, 2006

(30) Foreign Application Priority Data

Mar. 14, 2003    (DE) .................. 103 11 617

(51) Int. Cl.
- *C01F 11/18* (2006.01)
- *B02C 23/06* (2006.01)
- *C09B 67/04* (2006.01)
- *C09B 67/14* (2006.01)
- *C09C 1/02* (2006.01)
- *C09C 3/00* (2006.01)
- *C08F 20/06* (2006.01)

(52) U.S. Cl. .................. 106/465; 106/817; 241/16; 241/17; 423/430; 423/DIG. 15; 524/425

(58) Field of Classification Search .................. 241/16, 241/17; 106/465, 817; 423/430, DIG. 15; 524/425

See application file for complete search history.

(56) References Cited

U.S. PATENT DOCUMENTS

| | | | |
|---|---|---|---|
| 3,604,634 A | 9/1971 | Windle | |
| 4,175,066 A * | 11/1979 | Shibazaki et al. | 524/425 |
| 4,278,208 A * | 7/1981 | Falcon-Steward | 241/16 |
| 4,509,987 A | 4/1985 | Farrar et al. | |
| 4,839,417 A * | 6/1989 | Suetterlin et al. | 524/833 |
| 4,840,985 A * | 6/1989 | Gonnet et al. | 524/425 |
| 4,868,228 A * | 9/1989 | Gonnet et al. | 523/333 |
| 5,085,800 A * | 2/1992 | Minayoshi et al. | 516/33 |
| 5,181,662 A | 1/1993 | Bousquet et al. | |
| 5,241,011 A * | 8/1993 | Landscheidt et al. | 525/330.2 |
| 5,275,650 A * | 1/1994 | Mongoin et al. | 106/465 |
| 5,297,740 A * | 3/1994 | Landscheidt et al. | 241/16 |
| 5,573,188 A * | 11/1996 | Bousquet et al. | 241/16 |
| 6,395,813 B1 | 5/2002 | Duccini et al. | |

FOREIGN PATENT DOCUMENTS

| | | | |
|---|---|---|---|
| CA | 1241497 A * | 8/1988 | |
| DE | 36 20 149 | 12/1987 | |
| DE | 40 04 953 | 8/1991 | |
| EP | 113 048 | 7/1984 | |
| EP | 313 483 | 4/1989 | |
| JP | 53-144499 A * | 12/1978 | |
| JP | 54-6909 A * | 1/1979 | |
| JP | 57-184430 A * | 11/1982 | |
| JP | 59-193126 A * | 11/1984 | |
| JP | 61-174211 A * | 8/1986 | |
| JP | 2-129019 A * | 5/1990 | |
| JP | 2000-281959 | 10/2000 | |
| JP | 2002-090550 | 3/2002 | |

* cited by examiner

*Primary Examiner*—Anthony J. Green
(74) *Attorney, Agent, or Firm*—Oblon, Spivak, McClelland, Maier & Neustadt, P.C.

(57) ABSTRACT

The invention relates to the use of polyacrylic acids which contain organic terminal groups containing sulphur, comprising at least two carbon atoms, having an average molecular weight $M_w$ of 5 000-30 000 g/mol and which are at least partially neutralized by a base which is selected from the group of alkali hydroxides and ammonia as auxiliary agents for wet grinding of calcium carbonate. The invention also relates to fine particle aqueous suspensions of calcium carbonate which are produced by wet grinding of calcium carbonate in the presence of said polyacrylic acids.

20 Claims, No Drawings

USE OF POLYACRYLIC ACIDS AS GRINDING AIDS FOR CALCIUM CARBONATE

The present invention relates to the use of polyacrylic acids which comprise sulfur-containing organic terminal groups having at least two carbon atoms, have an average molecular weight $M_w$ of from 5 000 to 30 000 g/mol and are at least partly neutralized by a base selected from the group consisting of the alkali metal hydroxides and ammonia as assistants for the wet milling of calcium carbonate.

The present invention also relates to finely divided aqueous suspensions of calcium carbonate which have been prepared by wet milling of calcium carbonate in the presence of these polyacrylic acids.

Aqueous calcium carbonate suspensions are usually prepared by wet milling of natural calcium carbonate using polycarboxylates as milling assistants. Such calcium carbonate suspensions are used as fillers and white pigments in papermaking and in the surface coating industry. Good performance characteristics require a high degree of fineness of the milled pigment, which is to be achieved in a very short milling time. In addition, the pigment suspensions must have a good shelf-life since standing times of several days often occur between the milling process and the further processing and the suspensions must remain pumpable over this period.

JP-A-2000-281959 describes the wet milling of calcium carbonate using acrylic acid homo- and copolymers which have different terminal groups and are neutralized by a base mixture. The preferred polymers have average molecular weights $M_w$ of from 4 000 to 10 000 g/mol and are present as a mixed alkaline earth metal/alkali metal salt.

EP-A-113 048 discloses low molecular weight partly neutralized homo- and copolymers of acrylic acid ($M_w$ in the region of 1 000 g/mol) which are prepared in the presence of sulfur-containing regulators in a moving solid bed from polyamide powder and are recommended for a number of applications, inter alia as milling assistants for inorganic pigments.

EP-A-313 483 describes the use of the sodium salts of acrylic acid homo- and copolymers having an average molecular weight $M_w$ of up to 7 000 g/mol for the aqueous milling of lime. The polymers in the molecular weight range of from 200 to 1 900 g/mol are claimed, but information about the regulators used in each case in the polymerization is not given.

Furthermore, DE-A-40 04 953 discloses homo- and copolymers of acrylic acid as milling assistants and dispersants for calcium carbonate, which have been neutralized by addition of calcium hydroxide before the polymerization and of sodium hydroxide solution after the polymerization.

DE-A-36 20 149 describes the preparation of acrylic acid homopolymers and in particular copolymers using an initiator system comprising hydrogen peroxide, iron(II)sulfate and mercaptoethanol and the use of the unneutralized polymers as dispersants.

Finally, U.S. Pat. No. 6,395,813 discloses the use of phosphonate-terminated acrylic acid homo- and copolymers having an average molecular weight $M_w$ of from 2 000 to 5 800 g/mol as dispersants for calcium carbonate.

It is an object of the present invention to provide milling assistants for the wet milling of calcium carbonate which have excellent milling efficiency and provide calcium carbonate suspensions having excellent stability.

We have found that this object is achieved by the use of polyacrylic acids which comprise sulfur-containing organic terminal groups having at least two carbon atoms, have an average molecular weight $M_w$ of from 5 000 to 30 000 g/mol and are at least partly neutralized by a base selected from the group consisting of the alkali metal hydroxides and ammonia as assistants for the wet milling of calcium carbonate.

We have also found finely divided aqueous suspensions of calcium carbonate which have been prepared by wet milling of calcium carbonate in the presence of these polyacrylic acids or comprise from 0.1 to 2% by weight of these polyacrylic acids.

The polyacrylic acids to be used according to the invention preferably comprise, as sulfur-containing organic terminal groups, alkylthio groups which may be substituted by hydroxyl, amino and/or carboxyl, have altogether 2 to 20, preferably 2 to 12, carbon atoms and are straight-chain or branched.

Particularly suitable alkylthio groups are those which are substituted in the ω-position by hydroxyl or carboxyl.

Specific examples are 2-hydroxyethylthio, 3-hydroxypropylthio, 4-hydroxybutylthio, 6-hydroxyhexylthio, carboxymethylthio, 2-carboxyethylthio, dodecylthio and tert-dodecylthio, carboxymethylthio being preferred and 2-hydroxyethylthio being particularly preferred.

The polyacrylic acids to be used according to the invention have an average molecular weight $M_w$ of from 5 000 to 30 000, preferably from 7 500 to 20 000, g/mol.

The polyacrylic acids to be used according to the invention are at least partly neutralized by a base selected from the group consisting of the alkali metal hydroxides and ammonia.

Lithium hydroxide, sodium hydroxide, potassium hydroxide and ammonia are particularly suitable for the neutralization, sodium hydroxide and ammonia being preferred and sodium hydroxide being particularly preferred.

The degree of neutralization of the polyacrylic acids to be used according to the invention is preferably from 50 to 100%, in particular from 70 to 100%.

The polyacrylic acids to be used according to the invention are obtainable by free radical polymerization of acrylic acid. All known free radical polymerization processes, such as solution polymerization, emulsion polymerization, precipitation polymerization, suspension polymerization and mass polymerization, may be used for this purpose.

Solution polymerization in water is preferred, the monomer concentration being in particular from 10 to 70, especially from 20 to 60, % by weight.

Suitable polymerization initiators are customary compounds forming free radicals under the polymerization conditions, thermally activatable initiators being preferred. Examples are:

inorganic peroxo compounds, such as peroxodisulfates (e.g. lithium, potassium and ammonium peroxodisulfate, in particular sodium peroxodisulfate (sodium persulfate), peroxosulfates, percarbonates and hydrogen peroxide;

organic peroxo compounds, such as diacetyl peroxide, dioctanoyl peroxide, didecanoyl peroxide, dilauroyl peroxide, dibenzoyl peroxide, bis(o-tolyl)peroxide, succinyl peroxide, di-tert-butyl peroxide, diamyl peroxide, dilauryl peroxide, methyl ethyl ketone peroxide, acetylacetone peroxide, tert-butyl peracetate, tert-butyl permaleate, tert-butyl perisobutyrate, tert-butyl perpivalate, tert-amyl perpivalate, tert-butyl peroctanoate, tert-butyl perneodecanoate, tert-butyl per-2-ethylhexanoate, tert-butyl perbenzoate, tert-butyl hydroperoxide, cumyl hydroperoxide, tert-butyl peroxo-2-ethylhexanoate, diisopropyl peroxodicarbamate, dicyclohexyl peroxodicarbamate and dicyclohexyl peroxodicarbonate;

azo compounds such as 2,2'-azobisisobutyronitrile, 2,2'-azobis(2-methylbutyronitrile), 2,2'-azobis(2-amidinopropane)dihydrochloride, 2-(carbamoylazo)isobutyronitrile and 4,4'-azobis(4-cyanovaleric acid).

The initiators can be used alone or in the form of mixtures. Conventionally used amounts are from 0.05 to 15, preferably from 0.5 to 7, % by weight, based in each case on the acrylic acid monomer.

Combinations of the initiators with redox catalysts, in which the reducing component is present in less than the stoichiometric amount, are also suitable. Examples of such redox catalysts are transition metal salts, such as iron(II) sulfate, cobalt(II)chloride, nickel(II)sulfate, copper(I)chloride, manganese(II)acetate and vanadium(II)acetate.

Regulators used in the preparation of the polyacrylic acids to be used according to the invention are sulfur-containing compounds which lead to the incorporation of the sulfur-containing terminal groups described in detail above into the polymer. Examples are mercaptoethanol, mercaptopropanol, mercaptobutanols, mercaptohexanol, thioglycolic acid, dodecylmercaptan and tert-dodecylmercaptan, mercaptoethanol being particularly preferred.

As a rule, from 0.5 to 35, especially from 3 to 20, mol %, based in each case on the acrylic acid monomer, of regulator are used.

The polymerization temperature is as a rule from 70 to 150° C., preferably from 80 to 130° C. Particularly preferably, the procedure is carried out with boiling of the reaction mixture.

The polymerization can be carried out under atmospheric, reduced or superatmospheric pressure but is preferably effected in a closed system under autogenous pressure (usually from 1 to 5 bar).

In the preparation of the polyacrylic acids to be used according to the invention, it is possible to adopt a procedure in which acrylic acid and regulator in water are initially taken and are heated to the reaction temperature and the polymerization is started by adding the initiator. However, it is also possible initially to take only the regulator in water and, after heating, to add acrylic acid and initiator separately. Not least, it is also possible to add both regulator and acrylic acid and initiator, in each case separately all at once, batchwise or preferably continuously in water heated to the polymerization temperature and to effect polymerization.

The polymerization is preferably carried out in the absence of oxygen, in particular in an inert gas atmosphere, e.g. under nitrogen. It is advisable to ensure thorough mixing of the reactants during the polymerization.

The polyacrylic acids to be used according to the invention are used in at least partly neutralized form. They are therefore preferably reacted with ammonia or in particular with sodium hydroxide solution after the end of the polymerization. However, the acrylic acid can also be completely or partly neutralized before the polymerization.

The polyacrylic acids to be used according to the invention are obtained as aqueous solutions having a solids content of, as a rule, from 10 to 70, preferably from 20 to 60, % by weight and are usually also used in the form of these solutions as milling assistants.

The polyacrylic acids to be used according to the invention are very useful as milling assistants for the wet milling of calcium carbonate.

The calcium carbonate may be present in natural form as limestone, chalk or marble or in a synthetic form as precipitated calcium carbonate.

The milling is carried out continuously or batchwise in aqueous suspension. The calcium carbonate content in this suspension is as a rule $\geq 50$, preferably $\geq 60$, particularly preferably $\geq 70$, % by weight.

Usually, from 0.1 to 2, preferably from 0.3 to 1.5, % by weight, based in each case on the calcium carbonate comprised in the suspension, of the polyacrylic acids to be used according to the invention are employed.

With the aid of the polyacrylic acids to be used according to the invention, it is possible to obtain suspensions of particularly finely divided calcium carbonate (for surface coatings, at least 90% of the particles are as a rule <2 μm) without problems and in short milling times.

The calcium carbonate suspensions obtained according to the invention have excellent rheological properties and are still pumpable even after storage for 24 hours.

The novel calcium carbonate suspensions are very useful as white pigments in papermaking and in surface coatings and as fillers in thermoplastics. If desired, they can be converted into powder form by various drying methods, e.g. spray drying, drum drying or paddle drying, prior to use.

EXAMPLES

A) Preparation of Polyacrylic Acids

The average molecular weights $M_w$ stated for the polyacrylic acids prepared were determined by gel permeation chromatography in the aqueous phase using a polyacrylate standard.

A combination of 4 separation columns (internal diameter in each case 7.8 mm, length in each case 30 cm, column temperature in each case 35° C.) containing the separation materials stated in table 1 was used.

TABLE 1

| Column No. | Separation material | Polyethylene oxide cut-off |
|---|---|---|
| 1 | TSK G5000 PW xl | 4 000 to 1 000 000 |
| 2 | Waters Ultrahydrogel 1 000 | 1 000 000 |
| 3 | Waters Ultrahydrogel 500 | 400 000 |
| 4 | Waters Ultrahydrogel 500 | 400 000 |

The eluent used was 0.008 M TRIS buffer (tris(hydroxymethyl)aminomethane, Merck, Darmstadt) at pH 7 in distilled water with the addition of 0.15 mol/l of sodium chloride and 0.01 mol/l of sodium azide.

400 μl of the sample solution (1.5 g of polyacrylic acid/l) were injected in each case.

The flow rate was 0.5 ml/min. The number of theoretical plates of the combination of separation columns at this flow rate was 37 000.

The detector used was a differential refractometer ERC 7510 from ERMA.

The evaluation was terminated after a flow volume of 39.6 ml (M(Na-PAA) about 642) (integration limit). The integration of the chromatograms obtained was carried out on the basis of DIN 55672-1 with an accuracy of ±3%.

Example 1

21.00 kg of distilled water were initially taken in a pressure-resistant reactor having a stirrer, nitrogen feed and metering apparatus and were heated to an internal temperature of 100° C. while feeding nitrogen. Thereafter, continuously in three separate feeds, a mixture of 40.00 kg of acrylic acid and 7.00 kg of distilled water was added in 4 hours, a mixture of 0.4 kg of sodium persulfate and 4.00 kg of distilled water in 4.5 hours and 2.00 kg of mercaptoethanol in 3.75 hours. After the end of the sodium persulfate feed, cooling was effected to 80° C. and a mixture of 0.045 kg of 2,2'-azobis(2-amidinopropane)dihydrochloride and 1.47 kg of distilled water was metered in continuously in 30 minutes. After stirring for a further hour at 80° C., a pH of 7.0 was established by adding 42.00 kg of 50% strength by weight sodium hydroxide solution, the temperature being kept at ≦80° C. by cooling. Thereafter, 0.420 kg of 50% strength by weight hydrogen peroxide solution was metered in at 80° C. in 1 hour and stirring was continued for a further 2 hours.

A virtually colorless, clear solution of a polyacrylic acid sodium salt having an average molecular weight $M_w$ of 10 100 g/mol was obtained (solids content of the solution: 46.7% by weight).

Example 2

The procedure was analogous to example 1, except that the polyacrylic acid obtained was only 80% neutralized by adding 33.60 kg of 50% strength by weight sodium hydroxide solution and establishing a pH of 6.7.

A virtually colorless, clear solution of a partly neutralized polyacrylic acid having an average molecular weight $M_w$ of 10 100 g/mol was obtained (solids content of the solution: 50.0% by weight).

Example 3

The procedure was analogous to example 1, except that only 0.2 kg of sodium persulfate and 0.4 kg of mercaptoethanol were used and were metered in as in example 1. In addition, a pH of 6.9 was established by adding the amount of sodium hydroxide solution stated in example 1.

A virtually colorless, clear solution of a polyacrylic acid sodium salt having an average molecular weight $M_w$ of 15 500 g/mol was obtained (solids content of the solution: 46.3% by weight).

Comparative Example C1

376.0 g of distilled water were initially taken in a pressure-resistant reactor having a stirrer, nitrogen feed and metering apparatus and were heated to an internal temperature of 100° C. while feeding nitrogen. Thereafter, continuously in three separate feeds, 642.0 g of acrylic acid were added in 5 hours, 92.0 g of a 7% strength by weight aqueous sodium persulfate solution in 5.25 hours and 80.6 g of mercaptoethanol in 4.75 hours. After the end of the sodium persulfate feed, stirring was carried out for a further 15 minutes, cooling was then effected to 80° C. and a mixture of 1.31 g of 2,2'-azobis(2-amidinopropane)dihydrochloride and 23.0 g of distilled water was metered in continuously in 10 minutes. After stirring for a further hour at 80° C., a pH of 7.5 was established by adding 589.5 g of 50% strength by weight sodium hydroxide solution, the temperature being kept at ≦80° C. by cooling. Thereafter, 21.0 g of 50% strength by weight hydrogen peroxide solution were metered in at 80° C. in 1 hour and stirring was continued for 4 hours.

A virtually colorless, clear solution of a polyacrylic acid sodium salt having an average molecular weight $M_w$ of 2 500 g/mol was obtained (solids content of the solution: 46.1% by weight).

Comparative Example C2

350 g of distilled water were initially taken in a pressure-resistant reactor having a stirrer, nitrogen feed and metering apparatus and were heated to an internal temperature of 100° C. while feeding nitrogen. Thereafter, continuously in three separate feeds, 530 g of acrylic acid were added in 3 hours, 133 g of a 40% strength by weight aqueous sodium bisulfite solution in 3 hours and 154 g of 10% strength by weight aqueous sodium persulfate solution in 3.25 hours. After the end of the sodium persulfate feed, 580 g of 50% strength by weight sodium hydroxide solution were added continuously in 3 hours for neutralization (pH 7.5).

A virtually colorless, clear solution of a polyacrylic acid sodium salt having terminal sulfite groups and an average molecular weight $M_w$ of 12 000 g/mol was obtained (solids content of the solution: 46.2% by weight).

Comparative Example C3

41.53 g of distilled water, 235.34 g of isopropanol and 12.73 g of a 50% strength by weight hydrogen peroxide solution were initially taken in a pressure-resistant reactor having a stirrer, nitrogen feed and metering apparatus. The closed reactor was evacuated and heated to an internal temperature of 120° C. Thereafter, continuously in two separate feeds, a mixture of 560.32 g of acrylic acid, 275.44 g of isopropanol and 48.63 g of water was added in 6 hours and 25.91 g of 50% strength by weight hydrogen peroxide solution were added in 8 hours. Thereafter, cooling was effected to 80° C. and, after the isopropanol had been distilled off, a steam distillation was carried out. A pH of 7.3 was then established by adding 570 g of 50% strength by weight sodium hydroxide solution, and a solids content of about 50% was established by adding distilled water.

A virtually colorless, clear solution of a polyacrylic acid sodium salt having terminal isopropoxy groups and an average molecular weight $M_w$ of 4 000 g/mol was obtained (solids content of the solution: 49.6% by weight).

Comparative Example C4

450 g of distilled water and 5.13 g of 50% strength by weight phosphorous acid were initially taken in a pressure-resistant reactor having a stirrer, nitrogen feed and metering apparatus and were heated to an internal temperature of 100° C. while feeding nitrogen. Thereafter, continuously in three separate feeds, a mixture of 856.5 g of acrylic acid and 150 g of distilled water was added in 4 hours, a mixture of 8.57 g of sodium persulfate and 85.70 g of distilled water in 4.5 hours and 37 g of mercaptoethanol were added in 3.75 hours. After the end of the sodium persulfate addition, cooling was effected to 80° C. and a mixture of 0.966 g of 2,2'-azobis(2-amidinopropane)dihydrochloride and 31.5 g of distilled water was metered in continuously in 30 minutes. Thereafter, after stirring for a further hour at 80° C., for neutralization, initially 381 g of 50% strength by weight sodium hydroxide solution were added in 1 hour and then a suspension of 131 g of calcium hydroxide and 301 g of water was added, likewise in 1 hour, and finally a pH of 7.3 was established by adding 301 g of 50% strength by weight sodium hydroxide solution, the temperature being kept at ≦80° C. by cooling. Thereafter, 11.3 g of 50% strength by weight hydrogen peroxide solution were metered in at 80° C. in 1 hour and stirring was continued for a further 2 hours.

A pale brown, slightly turbid solution of a mixed calcium/sodium salt (molar ratio 70:30) of polyacrylic acid having an average molecular weight $M_w$ of 4 500 g/mol was obtained (solids content of the solution: 45.0% by weight).

B) Use of the Polyacrylic Acids Obtained

In order to test the prepared polyacrylic acids as milling assistants, in each case 200 g of calcium carbonate (Marble Flour, Imerys), 76.7 g of water and 1.67 g of polyacrylic acid were initially taken in a thermostatabie 500 ml double-walled vessel. Thereafter, 473 g of glass beads (1 mm diameter) were added and stirred in with the aid of a spatula. The milling was carried out using a milling apparatus of the Dispermat AE-C type (manufacturer VMA-Getzmann) with a polyamide double grinding disk at 4 000 rpm. The milling time was 90 minutes. During the milling, the double-walled vessel was thermostated with tap water. After the milling, the slurry was filtered over a 780 μm filter with the aid of a porcelain suction filter in order to separate off the glass beads. The viscosity of the slurry was determined immediately and after 24 hours with the aid of a Brookfield viscometer DV II. In addition, the particle size of the milled calcium carbonate pigment was measured by laser diffraction using an apparatus of the Malvern Master Sizer type and was stated in percentages <2 μm.

Good performance characteristics in paper coating slips are present in the case of pigment suspensions in which at least 90% of the pigment particles have a particle size of <2 μm and which are still pumpable after a storage time of 24 hours.

The results of the milling experiments are listed in table 2. Where no viscosity is stated, measurement was not possible because the viscosity was too high.

TABLE 2

| Polymer from ex. | Solids content in % by wt. | Particle size <2 μm | Viscosity in mPas immediately | Viscosity in mPas after 24 h | Appearance after 24 h |
|---|---|---|---|---|---|
| 1 | 72.0 | 96% | 340 | 1400 | fluid |
| 2 | 71.5 | 94% | 330 | 1350 | fluid |
| 3 | 71.8 | 92% | 400 | 1630 | fluid |
| C1 | 71.5 | 75% | 2200 | — | not pumpable |
| C2 | 72.0 | 60% | 1800 | — | not pumpable |
| C3 | 72.1 | 77% | 3323 | — | not pumpable |
| C4 | 71.5 | 83% | 800 | 1800 | viscous |

We claim:

1. A method of wet milling calcium carbonate comprising wet milling the calcium carbonate with assistants comprising polyacrylic acids which comprise sulfur comprising organic terminal groups comprising at least two carbon atoms, have an average molecular weight $M_w$ of from 5,000 to 30,000 g/mol and are at least partly neutralized by a base selected from the group consisting of the alkali metal hydroxides and ammonia.

2. The method as claimed in claim 1, wherein the polyacrylic acids comprise, as sulfur comprising organic terminal groups, alkylthio groups which may be substituted by hydroxyl, amino, carboxyl, or a combination thereof, and have altogether 2 to 20 carbon atoms.

3. The method as claimed in claim 1, wherein the polyacrylic acids comprise, as sulfur comprising organic terminal groups, alkylthio groups having an ω-position which are substituted in the ω-position by hydroxyl or carboxyl.

4. The method as claimed in claim 1, wherein the polyacrylic acids comprise 2-hydroxyethylthio groups as sulfur comprising organic terminal groups.

5. The method as claimed in claim 1, wherein the polyacrylic acids have an average molecular weight $M_w$ of from 7,500 to 20,000 g/mol.

6. The method as claimed in claim 1, wherein the polyacrylic acids are at least partly neutralized by sodium hydroxide or by ammonia.

7. The method as claimed in claim 1, wherein a degree of neutralization of the polyacrylic acids is from 50 to 100%.

8. The method as claimed in claim 2, wherein the polyacrylic acids comprise, as sulfur-comprising organic terminal groups, alkylthio groups having an ω-position which are substituted in the ω-position by hydroxyl or carboxyl.

9. The method as claimed in claim 2, wherein the polyacrylic acids comprise 2-hydroxyethylthio groups as sulfur-comprising organic terminal groups.

10. The method as claimed in claim 3, wherein the polyacrylic acids comprise 2-hydroxyethylthio groups as sulfur-comprising organic terminal groups.

11. The method as claimed in claim 2, wherein the polyacrylic acids have an average molecular weight $M_w$ of from 7,500 to 20,000 g/mol.

12. The method as claimed in claim 3, wherein the polyacrylic acids have an average molecular weight $M_w$ of from 7,500 to 20,000 g/mol.

13. The method as claimed in claim 4, wherein the polyacrylic acids have an average molecular weight $M_w$ of from 7,500 to 20,000 g/mol.

14. The method as claimed in claim 2, wherein the polyacrylic acids are at least partly neutralized by sodium hydroxide or by ammonia.

15. The method as claimed in claim 3, wherein the polyacrylic acids are at least partly neutralized by sodium hydroxide or by ammonia.

16. The method as claimed in claim 4, wherein the polyacrylic acids are at least partly neutralized by sodium hydroxide or by ammonia.

17. The method as claimed in claim 5, wherein the polyacrylic acids are at least partly neutralized by sodium hydroxide or by ammonia.

18. The method as claimed in claim 2, wherein a degree of neutralization of the polyacrylic acids is from 50 to 100%.

19. A finely divided aqueous suspension of calcium carbonate, which suspension has been prepared by the method as claimed in claim 1.

20. A finely divided aqueous suspension of calcium carbonate, which suspension comprises from 0.1 to 2% by weight, based on the amount of calcium carbonate, of polyacrylic acids which suspension has been prepared by the method as claimed in claim 1.

* * * * *